(12) United States Patent
Feng et al.

(10) Patent No.: US 12,196,985 B2
(45) Date of Patent: Jan. 14, 2025

(54) OPTICAL FILM FOR MiniLED BACKLIGHT MODULE AND METHOD FOR PREPARING SAME

(71) Applicant: HEFEI UNIVERSITY OF TECHNOLOGY, Hefei (CN)

(72) Inventors: Qibin Feng, Hefei (CN); Huili Xiao, Hefei (CN); Le Zhang, Hefei (CN); Ling Yang, Hefei (CN); Guoqiang Lv, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 535 days.

(21) Appl. No.: 17/529,194

(22) Filed: Nov. 17, 2021

(65) Prior Publication Data
US 2023/0062823 A1 Mar. 2, 2023

(30) Foreign Application Priority Data
Aug. 26, 2021 (CN) .......................... 202110986808.1

(51) Int. Cl.
*G02B 5/02* (2006.01)
*G02B 5/08* (2006.01)

(52) U.S. Cl.
CPC ............. *G02B 5/0278* (2013.01); *G02B 5/08* (2013.01)

(58) Field of Classification Search
CPC .......... G02B 5/0278; G02B 5/08; G02B 5/02; G02B 5/0205; G02B 5/021; G02B 5/0215; G02B 5/031; G02B 5/0273; G02B 2/0284; G02B 5/0289; G02B 5/04; G02B 5/09; G02F 1/133504; G02F 1/133507; G02F 1/133553; G02F 1/133603; G02F 1/133605; G02F 1/133606

USPC ....... 359/615, 599, 515, 527, 528, 546, 831, 359/833, 834, 838, 850, 855, 856, 857; 362/97.1, 97.2, 97.3, 227, 235, 237, 241, 362/242, 243, 249.01, 249, 2, 257, 362/296.01, 297, 298, 32, 341, 346; 349/61, 62, 64, 67, 112

See application file for complete search history.

(56) References Cited

U.S. PATENT DOCUMENTS

2012/0039078 A1* 2/2012 Masuda ............ G02F 1/133606
362/311.06

FOREIGN PATENT DOCUMENTS

CN 205539551 U * 8/2016

* cited by examiner

*Primary Examiner* — Arnel C Lavarias

(57) ABSTRACT

An optical film for a sub-millimeter light emitting diode (MiniLED) backlight module and a method for preparing the optical film are disclosed. The MiniLED backlight module includes a diffusion film, an optical film, a reflection film and MiniLED chips. The diffusion film is provided above the optical film. The reflection film is provided under the MiniLED chips. The MiniLED chips are provided between the reflection film and the optical film. The first end of the optical film includes multiple first microstructures. The second end of the optical film includes multiple second microstructures. In the disclosure, photoresists are spin-coated on one end of an optical film substrate. A lithography direct write process is adopt to form a microstructure morphology on the surface of the OCA. The morphology is cured after development and hot baking to obtain an optical film.

6 Claims, 3 Drawing Sheets

OPTICAL FILM FOR MiniLED BACKLIGHT MODULE AND METHOD FOR PREPARING SAME

CROSS REFERENCE TO RELATED APPLICATION

This patent application claims the benefit and priority of Chinese Patent Application No. 202110986808.1 filed on Aug. 26, 2021, the disclosure of which is incorporated by reference herein in its entirety as part of the present application.

TECHNICAL FIELD

The present disclosure relates to the technical field of liquid crystal display, and more specifically, to an optical film for a MiniLED backlight module and a method for preparing the optical film.

BACKGROUND ART

After years of development, liquid crystal display (LCD) has become the mainstream technology of flat panel display. Since liquid crystal does not emit light, backlight is needed to provide illumination light. The brightness, chromaticity and volume of the backlight module heavily affect the performance of the final display. Reducing the thickness of a display as more as possible has become a popular trend, which requires a backlight module to be as thinner as better.

LED has become the mainstream light source of an LCDbacklight module. With the development of semiconductor technology, the size of an LED light-emitting chip is reduced to several hundred micrometers, and MiniLED appears. The MiniLED chips are small in size and low in heat generation, and can be densely arranged in a backlight module in a matrix manner. Since the distance between the chips is small, the optical mixing distance can be greatly reduced. But when the optical mixing distance is required to be less than 1 mm, the diffusion film based on the diffusion particles used in the existing backlight module has no diffusing effect, and cannot meet the requirement on uniformity of an ultra-thin backlight module.

SUMMARY

The purpose of the present disclosure is to provide an optical film which can be used for a MiniLED backlight module with an optical mixing distance less than 1 mm. Firstly, according to the light emission characteristics of MiniLED chips, the surface microstructure of the first layer optical film is designed based on the total reflection theory, and the surface microstructure of the second layer optical film is designed according to the light emission characteristics of the rays emitted from the first layer optical film. The microstructures of the first layer optical film and the microstructures of the second layer optical film are respectively prepared on both sides of the substrate by using maskless direct writing lithography technology, and the microstructures are cured after development and hot baking. The surface of the photoresist is electroplated to form a metal master mold, which can be reproduced for mass production.

To achieve the above object, the disclosure provides an optical film for a MiniLED backlight module, wherein the MiniLED backlight module includes a diffusion film, an optical film, a reflection film and MiniLED chips.

The diffusion film is provided above the optical film.

The reflection film is provided under the MiniLED chips.

The MiniLED chips are provided between the reflection film and the optical film.

The first end of the optical film includes multiple first microstructures, and each of the first microstructures is a first isosceles triangle structure.

The second end of the optical film includes multiple second microstructures, and each of the second microstructures is a second isosceles triangle structure.

A first base angle of the first isosceles triangle structure is 20°-70°.

A second base angle of the second isosceles triangle structure is 20°-70°.

A first width of the first microstructure is 20 µm-40 µm.

A second width of the second microstructure is 20 µm-40 µm.

Preferably, the first base angle is 35°-65°.

The second base angle is 35°-65°.

A first width of the first microstructure is 25 µm-35 µm.

A second width of the second microstructure is 25 µm-35 µm.

Preferably, the first base angle is 450 and the second base angle is 45°.

A first width of the first microstructure is 33 µm.

A second width of the second microstructure is 33 µm.

Preferably, the diffusion film has a first distance from the optical film.

The optical film has a second distance from the reflection film.

The first distance is less than 1 mm; and the second distance is less than 1 mm.

Preferably, the first distance is 0 mm.

The second distance is 0 mm; and the first microstructure and the second microstructure are provided symmetrically.

Preferably, the first microstructure is configured to reflect the rays emitted by a MiniLED chip back to the bottom of the backlight to the maximum extent.

The second microstructure is configured to reflect the rays emitted by the first microstructure back to the first microstructure to the maximum extent.

The method for preparing an optical film for a MiniLED backlight module, including the steps as follows.

Spin-coating photoresists on one end of an optical film substrate;

Forming a microstructure morphology by using a lithography direct write process, wherein a thickness of the photoresist is greater than 10 µm; and Curing the morphology after development and hot baking to obtain an optical film.

Preferably, in the process of forming the microstructure morphology by adopting a lithography direct write process, the design method of the microstructure morphology includes the following steps:

setting a width D of a single microstructure and setting an initial morphology of the single microstructure as an isosceles triangle, and acquiring a base angle θ of the isosceles triangle;

discretizing the base angleθ of the isosceles ttriangle base angle $\theta_k$, wherein, $$\theta_k = 20 + \frac{70-20}{100} \times (k-1), k = 1, 2, 3, e\ angl$$

acquiring a discrete point light source $P_i$ corresponding to each of the microstructures and a light-emitting angle range $(-\alpha_{max}, \alpha_{max})$ of the discrete point light source $P_i$ based on the light-emitting characteristics of the Mini-LED chip, wherein i=1, 2, 3,-emitti setting a first refractive index n of the photoresist and a second refractive index no of air;

acquiring a range $(-c_{max}, \beta_{max})$ of a divergence angle ve index the eristics of the MiniLED chip,ng angle range$_i$ into the optical film based on the light-emitting angle range of the discrete point light source $P_i$;

discretizing the value from 0 to $\beta_{max}$ into $\beta_j$, acquiring a first ray energy $Q_{ij}$ of $\beta_j$, wherein $$\beta_j = -\beta_{max} + \frac{2 \times \beta_{max}}{154} \times (j-1), j = 1, 2, 3, g \, a \, f;$$

accumulating the first ray energy $Q_{ij}$ by cycling for k to obtain a second ray energy $Q_{ij-k}$;

acquiring the triangular base angle $\theta_k$ corresponding to the maximum value based on the maximum value of the second ray energy $Q_{ij-k}$, and acquiring the microstructure morphology of the optical film according to the triangular base angle $\theta_k$.

Preferably, the maximum divergence angle of the rays that are emitted by the discrete point light source $P_i$ and enter into the optical film is $\beta_{max}$=arcsin(sin $\alpha_{max}$/n).

Preferably, in the process of accumulating the first ray energy $Q_{ij}$ to obtain the second ray energy $Q_{ij-k}$, k is cycled by one value, i is cycled from 1 to D, and j is cycled from 1 to 155; wherein the above circulation process needs to satisfy the following formula:

$$\beta_j > \arctan\left(\frac{\tan\theta}{1 - 0.05 \times i}\right)$$

$$\theta - \beta_j > \arcsin\left(\frac{1}{n}\right)$$

$$180° - 3 \times \theta + \beta_j > \arcsin(1/n)$$

$$\arcsin[n \times \sin(\theta' - \beta'_j)] \geq 90 - \theta.$$

Beneficial technical effects of the present disclosure are: the two-layer microstructure morphologies are designed according to the law of total internal reflection to ensure that the microstructure of first layer optical film can maximally reflect the rays emitted by the MiniLED chips back to the bottom of the backlight in the disclosure, while the microstructure of the second layer optical film can maximally reflect the rays emitted by the first layer optical film back to the first layer optical film, thereby reducing the optical mixing distance, further reducing the thickness of the MiniLED backlight module and realizing the near-zero design.

In addition, the idea of the present disclosure can be applied to the design of the LED backlight module with wide practical range and high popularization value.

BRIEF DESCRIPTION OF THE DRAWINGS

In order to explain the embodiment of the present disclosure or the technical schemes in the prior art more clearly, the drawings used in the embodiment or the description of the prior art will be briefly introduced below. Obviously, the drawings in the following description are only embodiments of the present disclosure, and for ordinary technicians in the field, other drawings can be obtained according to the provided drawings without paying creative effort.

DETAILED DESCRIPTION OF THE EMBODIMENTS

Figure 1:
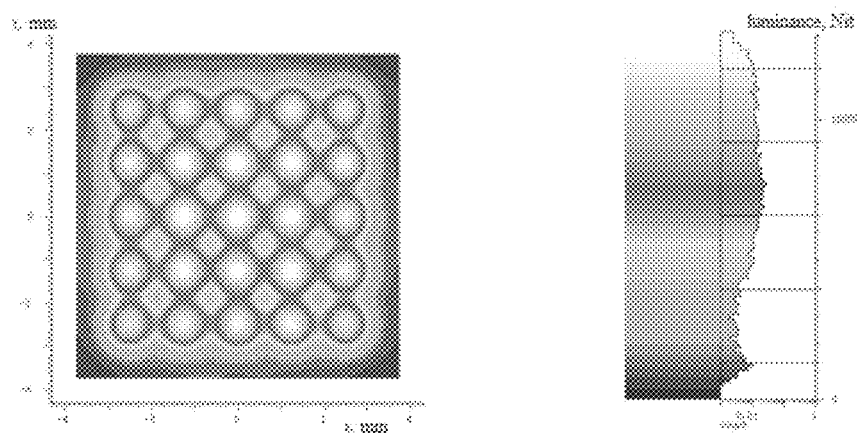
FIG. 1 is a simulated illuminance diagram when a traditional diffusion film is used and the optical mixing distance is 1 mm according to an embodiment of the present disclosure.

In order to make the purpose, technical scheme and advantages of the embodiments of this application clearer, the technical scheme in the embodiments of this application will be described clearly and completely with reference to the drawings in the embodiments of this application. Obviously, the described embodiments are only part of the embodiments of this application, not all of them. Generally, the components of the embodiments of the present application described and illustrated in the drawings herein may be arranged and designed in various different configurations. Therefore, the following detailed description of the embodiments of the application provided in the drawings is not intended to limit the scope of the claimed application, but only represents selected embodiments of the application. Based on the embodiments of this application, all other embodiments obtained by the person skilled in the art without making creative labor belong to the protection scope of this application.

As shown in FIGS. 1-6, the disclosure provides an optical film for a MiniLED backlight module, wherein the Mini-LED backlight module includes a diffusion film, an optical film, a reflection film and MiniLED chips, wherein, the diffusion film is provided above the optical film; the reflection film is provided under the MiniLED chips; the Mini-LED chips are provided between the reflection film and the optical film.

The first end of the optical film includes multiple first microstructures, and each of the first microstructures is a first isosceles triangle structure.

The second end of the optical film includes multiple second microstructures, and each of the second microstructures is a second isosceles triangle structure.

A first base angle of the first isosceles triangle structure is 20°-70°.

A second base angle of the second isosceles triangle structure is 20°-70°.

A first width of the first microstructure is 20 μm-40 μm.

A second width of the second microstructure is 20 μm-40 μm.

Further, the first base angle is 35°-65°; the second base angle is 35°-65°; a first width of the first microstructure is 25 μm-35 μm; and a second width of the second microstructure is 25 μm-35 μm.

Further, the first base angle is 45°; the second base angle is 45°; a first width of the first microstructure is 33 μm; and a second width of the second microstructure is 33 μm.

Further, the diffusion film has a first distance from the optical film; the optical film has a second distance from the reflection film; the first distance is less than 1 mm; and the second distance is less than 1 mm.

Further, the first distance is 0 mm; the second distance is 0 mm; and the first microstructure and the second microstructure are provided symmetrically.

Further, the first microstructure is configured to reflect the rays emitted by a MiniLED chip back to the bottom of the backlight to the maximum extent; the second microstructure is configured to reflect the rays emitted by the first microstructure back to the first microstructure to the maximum extent.

The method for preparing an optical film for a MiniLED backlight module, including the following steps:
spin-coating photoresist on one end of an optical film substrate;
forming a microstructure morphology by using a lithography direct write process, wherein a thickness of the photoresist is greater than 10 μm;
curing the morphology after development and hot baking to obtain an optical film.

Further, in the process of forming the microstructure morphology by adopting a lithography direct write process, the design method of the microstructure morphology includes the following steps:
setting a width D of a single microstructure and setting an initial morphology of the single microstructure as an isosceles triangle, and acquiring a base angle θ of the isosceles triangle;
discretizing the base angle θ to get a serial of triangle base angle $\theta_k$, wherein, $$\theta_k = 20 + \frac{70-20}{100} \times (k-1), k = 1, 2, 3, 1 \text{ erei};$$

acquiring a discrete point light source Pi corresponding to each of the microstructures and a light-emitting angle range ($-_{max}$, $\alpha_{max}$) of the discrete point light source Pi based on the light-emitting characteristics of the MiniLED chips, wherein i=1, 2, 3, . . . , D/2;
setting a first refractive index n of the photoresists and a second refractive index no of air;
acquiring a range ($-c_{max}$, $\beta_{max}$) of a divergence angle dex the rays emitted by the discrete point light source Pi into the optical film based on the light-emitting angle range of the discrete point light source Pi;
discretizing the value from 0 to $\beta_{max}$ into $\beta_j$, acquiring a first light energy $Q_{ij}$ of $\beta_j$, wherein $$\beta_j = -\beta_{max} + \frac{2 \times \beta_{max}}{154} \times (j-1), j = 1, 2, 3, 1 \text{ here};$$

accumulating the first ray energy $Q_{ij}$ by cycling for k to obtain a second ray energy $Q_{ij-k}$;
acquiring the triangular base angle $\theta_k$ corresponding to the maximum value based on the maximum value of the second light energy $Q_{ij-k}$, and acquiring the microstructure morphology of the optical film according to the triangular base angle $\theta_k$.

Further, the maximum divergence angle of the rays emitted by the discrete point light source $P_i$ into the optical film is $\beta_{max}=\arcsin(\sin p_{max}/n)$.

Further, in the process of accumulating the first light energy $Q_{ij}$ to obtain the second light energy $Q_{ij-k}$, k is cycled by one value, i is cycled from 1 to d, and j is cycled from 1 to 155; wherein the above circulation process needs to satisfy the following formula:

$$\beta_j > \arctan\left(\frac{\tan\theta}{1 - 0.05 \times i}\right)$$

$$\theta - \beta_j > \arcsin\left(\frac{1}{n}\right)$$

$$180° - 3 \times \theta + \beta_j > \arcsin(1/n)$$

$$\arcsin[n \times \sin(\theta' - \beta'_j)] \geq 90 - \theta.$$

Figure 2:
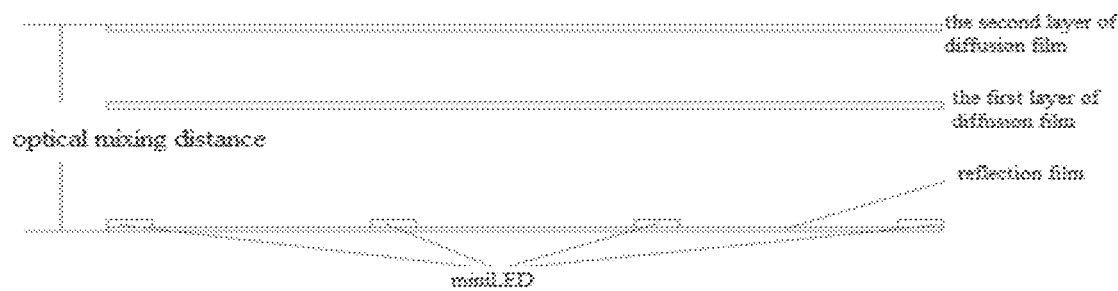
FIG. 2 is a schematic diagram of an existing backlight module using two diffusion films according to an embodiment of the present disclosure.
Figure 3:
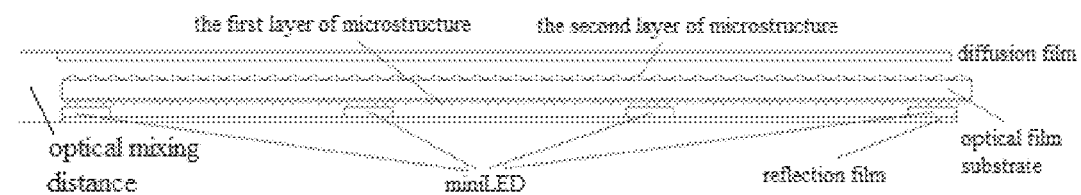
FIG. 3 is a schematic diagram of an optical film arrangement according to an embodiment of the present disclosure.
Figure 4A:
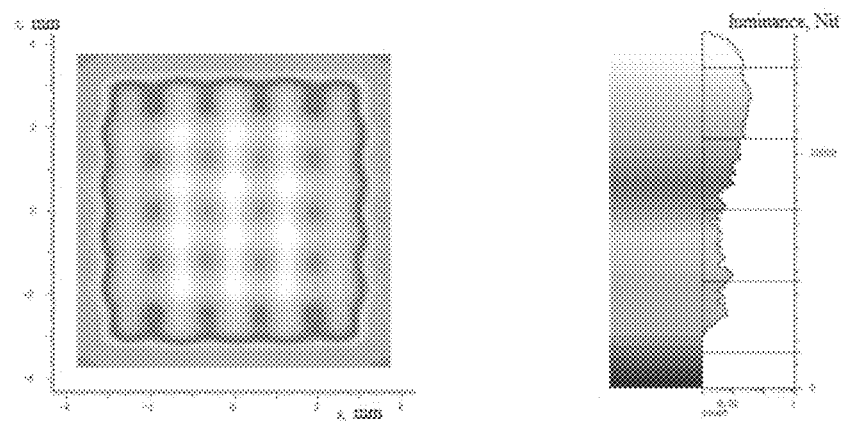
FIG. 4A is a forward simulated illuminance diagram of the designed microstructure optical film according to the first embodiment of the present disclosure.
Figure 4B:
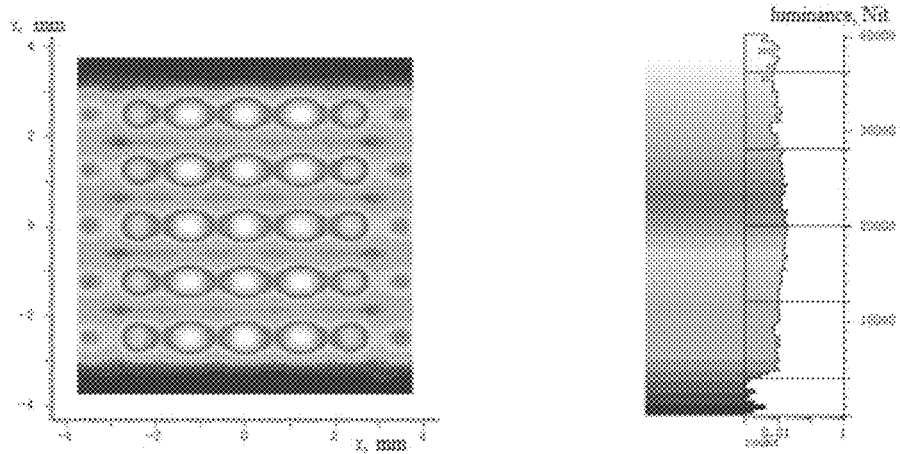
FIG. 4B is an illuminance diagram reflecting back to the direction of the lamp plate of the designed microstructure optical film according to the first embodiment of the present disclosure.
Figure 5A:
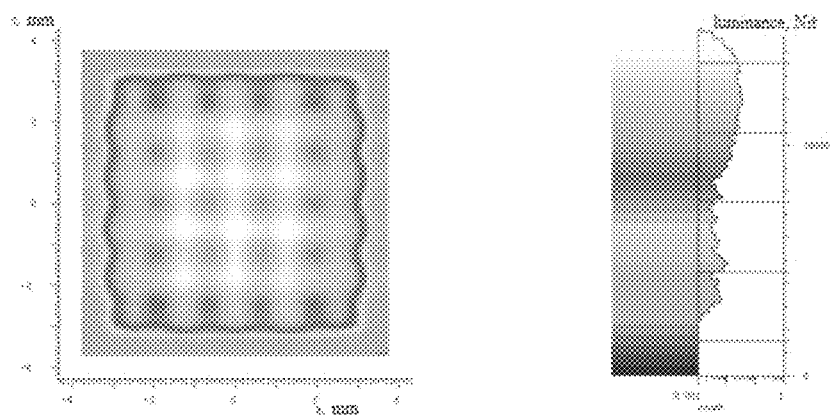
FIG. 5A is a forward simulated illuminance diagram of the designed microstructure optical film according to the second embodiment of the present disclosure.
Figure 5B:
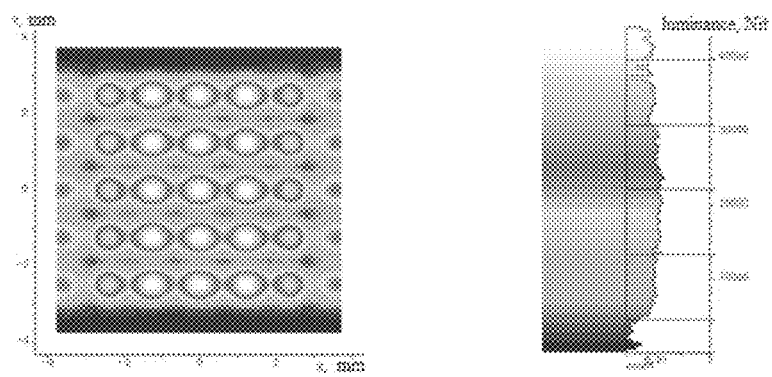
FIG. 5B is an illuminance diagram reflecting back to the direction of the lamp plate of the designed microstructure optical film according to the second embodiment of the present disclosure.

Embodiment 1: as shown in FIG. 2, an existing backlight module adopts a two-layer diffusion film mode. When the diffusion film on the market is directly placed on the MiniLED or the distance is very close (less than 1 mm), there is no diffusion effect, so that the mixed distance is very large due to the adoption of the technical scheme of the existing diffusion film.

as shown in FIG. 3, in the MiniLED backlight module proposed by the present patent, the optical film with microstructure on both sides can be directly placed on the MiniLED, and a diffusion film is provided at a position very close to each other (less than 1 mm), so that a good uniformity can be obtained. The two sides of the substrate of the optical film provided by the present patent have a microstructure, the shape of the microstructure is an isosceles triangle, the base angle is between 20° and 70°, the width of the microstructure is between 15 um and 50 um, and the two layers of microstructures may be the same or different.

The disclosure provides an design and preparation method for an optical film, which is carried out according to the following steps:
step 1: designing a surface microstructure of the first layer optical film;
1.1. setting a width D of a single microstructure, wherein D is between 20 μm and 40 μm;
1.2. setting an initial morphology of a single microstructure as an isosceles triangle, wherein the triangle base angle is θ, and the range of θ is (20°, 70°);
1.3. setting the base angle of the discrete triangle as le microsin $$\theta_k = 20 + \frac{70-20}{100} \times (k-1), k = 1, 2, 3, 1 \text{ e ba};$$

1.4. setting the discrete point light sources Pi, i=1, 2, 3, . . . , D/2 corresponding to each microstructure, and the light emitting characteristics of each point light source are the same as those of each MiniLED chip;
1.5. setting the light emitting angle range of each point light source $P_i$ as ($-\alpha$ max, $\alpha$ max);

1.6. setting the refractive index of optical film material as n and the refractive index of air as n0;
1.7. after the rays emitted by the point light source Pi enters the optical film, the maximum divergence angle is β max=arcsin(sin α max/n), and the light emitting angle range is (−β max, β max);
1.8. discretizing 0 to $\beta_{max}$ into $\beta_j$, wherein $$\beta_j = -\beta_{max} + \frac{2 \times \beta_{max}}{154} \times (j-1)$$

j=1, 2, 3, 1 eret;
1.9. setting the energy of light with an angle $\beta_j$ emitted by each discrete point light source Pi as $Q_{ij}$;
1.10. k is cycled with a value, I is cycled from 1 to d and j is cycled from 1 to 155. if the following formula is met, $Q_{ij}$ will be accumulated and recorded as $Q_{ij\text{-}k}$;

$$\beta_j > \arctan\left(\frac{\tan\theta}{1 - 0.05 \times i}\right)$$

$$\theta - \beta_j > \arcsin\left(\frac{1}{n}\right)$$

$$180° - 3 \times \theta + \beta_j > \arcsin(1/n)$$

$$\arcsin\left[n \times \sin(\theta' - \beta_j')\right] \geq 90 - \theta$$

1.11. getting $Q_{ij\text{-}k}$ corresponding to each k value from 1.10, and select 0 k corresponding to the largest $Q_{ij\text{-}k}$, thus determining the microstructure morphology of the first optical film;

step 2: designing the surface microstructure of the second layer optical film;
2.1. setting a width D' of a single microstructure, wherein D' is between 20 μm and 40 μm;
2.2. setting an initial morphology of a single microstructure as an isosceles triangle, with the triangle base angle θ' and the θ' range (20. 700.;
2.3. setting a base angle of the discrete triangle as sing $$\theta_k' = 20 + \frac{70-20}{100} \times (k-1), k = 1, 2, 3, 1\ se\ a;$$

2.4. setting the discrete point light sources Pi', i=1, 2, 3, ..., D/2 corresponding to each microstructure, and the light emitting characteristics of each point light source are the same as those of the rays emitted from the first layer optical film;
2.5. setting the light emitting angle range of each point light source Pi' as $-5_{max}'$, $\alpha_{max}'$);
2.6. setting the refractive index of optical film material as n and the refractive index of air as $n_0$;
2.7. after the rays emitted by the point light source Pi' enters the optical film, the maximum divergence angle is $\beta_{max}'$ ax enters th$_{max}'$/n), and the luminous angle range is $(-a_{max}', \beta_{max}')$;
2.8. discretizing 0 to tiz luminous angle rain $$\beta_j' = -\beta_{max}' + \frac{2 \times \beta_{max}'}{154} \times (j-1), j = 1, 2, 3, 1\ \text{to}\ t;$$

2.9. setting the energy of light rays with an angle βj' emitted by each discrete point light source $P_i'$ as $Q_{ij}'$;

2.10. every time k is cycled, i will cycle from 1 to d and j will cycle from 1 to 155. if the following formula is met, Qij' will be accumulated and recorded as $Q_{ij\text{-}k}'$;

$$\beta_j' > \arctan\left(\frac{\tan\theta'}{1 - 0.05 \times i}\right)$$

$$\theta' - \beta_j' > \arcsin\left(\frac{1}{n}\right)$$

$$180° - 3 \times \theta' + \beta_j' > \arcsin(1/n)$$

$$\arcsin\left[n \times \sin(\theta' \sim \beta_j')\right] \geq 90 - \theta'$$

Figure 6:
FIG. 6 is a schematic diagram of a MiniLED backlight module according to an embodiment of the present disclosure.

2.11. obtaining $Q_{ij\text{-}k}'$ corresponding to each k value from 2.10, and selecting $\theta_k'$ corresponding to the largest $Q_{ij\text{-}k}'$, thus determining the microstructure morphology of the second optical film;
step 3: preparing the surface microstructure of the optical film obtained in step 1 and step 2.
3.1. spin-coating photoresists with a thickness of H on one side of the substrate material, wherein H is greater than 10 μm, forming a first layer of microstructure morphology by photolithography direct writing technology, and curing the morphology after development and hot baking;
3.2. spin-coating photoresists with thickness of H on the other side of the substrate material, wherein H is greater than 10 μm, forming a second layer of microstructure morphology by photolithography direct writing technology, and curing the morphology after development and hot baking;
3.3. mass production by reprinting;

As shown in FIG. 6, FIG. 6 is a schematic diagram of a MiniLED backlight module. The microstructure optical film is an optical film in the disclosure, which is based on polyethyleneterephthalate (PET) or polymethyl methacrylate (PMMA) (thickness is between 100 um and 300 um). One side of the substrate (close to MiniLED) has microstructure, and the other side also has microstructure. The function of the two layers of microstructures is to reflect the rays emitted by MiniLED back to the bottom surface of backlight module to the maximum extent, and light is scattered and propagated upwards through the reflection layer of the bottom surface, so that the uniformity is improved, the light mixing distance is reduced, and the near-zero design is realized.

It should be noted that similar reference numerals and letters indicate similar items in the following drawings, so once an item is defined in one drawing, it is not necessary to further define and explain it in the following drawings. In addition, the terms "first", "second", "third", etc. are only used to distinguish descriptions, but cannot be understood as indicating or implying relative importance.

Finally, it should be noted that the above-mentioned embodiments are only concrete embodiments of the present disclosure, and are used to illustrate the technical scheme of the present disclosure, but not to limit it. Although the present disclosure has been described in detail with reference to the above-mentioned embodiments, ordinary people in the field should understand that any person familiar with the technical field can still modify or easily think of changes to the technical scheme described in the above-mentioned embodiments within the technical scope disclosed by the present disclosure, or. However, these modifications, changes or substitutions do not make the essence of the corresponding technical solutions deviate from the spirit and scope of the technical solutions of the embodiments of the present disclosure. Should be covered within the protection scope of the present disclosure. Therefore, the protection scope of the present disclosure shall be subject to the protection scope of the claims.

What is claimed is:

1. An optical film for a MiniLED backlight module, wherein the MiniLED backlight module comprises a diffusion film, an optical film, a reflection film and MiniLED chips, wherein, the diffusion film is provided at an upper end of the optical film; the reflection film is provided at a lower end of the optical film; the MiniLED chips are provided between the reflection film and the optical film; a first end of the optical film comprises a plurality of first microstructures, and each of the first microstructures is a first isosceles triangle structure; a second end of the optical film comprises a plurality of second microstructures, and each of the second microstructures is a second isosceles triangle structure; a first base angle of the first isosceles triangle structure is 20°-70°; a second base angle of the second isosceles triangle structure is 20°-70°; a first width of the first microstructure is 20 μm-40 μm; and a second width of the second microstructure is 20 μm-40 μm.

2. The optical film of claim 1, wherein the first base angle is 35°-65°; the second base angle is 35°-65°; the first width of the first microstructure is 25 μm-35 μm; and the second width of the second microstructure is 25 μm-35 μm.

3. The optical film of claim 2, wherein the first base angle is 45°; the second base angle is 45°; the first width of the first microstructure is 33 μm; and the second width of the second microstructure is 33 μm.

4. The optical film of claim 3, wherein the diffusion film has a first distance from the optical film; the optical film has a second distance from the reflection film, the first distance is less than 1 mm; and the second distance is less than 1 mm.

5. The optical film of claim 4, wherein the first distance is 0 mm; the second distance is 0 mm; and the first microstructure and the second microstructure are provided symmetrically.

6. The optical film of claim 5, wherein the first microstructure is configured to reflect rays emitted by a MiniLED chip back to a bottom portion of a backlight to a maximum extent; the second microstructure is configured to reflect rays emitted by the first microstructure back to the first microstructure to a maximum extent.

* * * * *